United States Patent [19]
Sagae et al.

[11] 3,928,718

[45] Dec. 23, 1975

[54] IMAGE REPRODUCING SYSTEM

[75] Inventors: Syoji Sagae, Hitachiota; Tetsuo Doi, Hitachi, both of Japan

[73] Assignee: Hitachi, Ltd., Japan

[22] Filed: May 7, 1974

[21] Appl. No.: 467,795

[30] Foreign Application Priority Data

| | | |
|---|---|---|
| May 9, 1973 | Japan | 48-50757 |
| July 25, 1973 | Japan | 48-83089 |
| July 25, 1973 | Japan | 48-83090 |

[52] U.S. Cl. ................ 178/6.6 R; 346/75

[51] Int. Cl.² ................ H04N 1/22; G01D 15/18

[58] Field of Search ...... 346/75; 178/6.6 R; 358/75; 250/206

[56] References Cited

UNITED STATES PATENTS

| | | | |
|---|---|---|---|
| 2,804,574 | 8/1957 | Kingsbury | 250/206 X |
| 3,373,437 | 3/1968 | Sweet et al. | 346/75 |
| 3,404,221 | 10/1968 | Loughren | 358/75 |
| 3,560,641 | 2/1971 | Taylor et al. | 178/6.6 R |
| 3,596,275 | 7/1971 | Sweet | 346/75 X |
| 3,604,846 | 9/1971 | Behane et al. | 178/6.6 R |

*Primary Examiner*—Joseph W. Hartary
*Attorney, Agent, or Firm*—Craig & Antonelli

[57] ABSTRACT

An image reproducing system in which ink droplets are periodically jetted from an ink jet nozzle, and the relative density of successive portions of an image carried by an original is detected by a photoelectric converter to obtain a signal representing the relative density of the successive portions of the image carried by the original, this signal being utilized for charging the ink droplets jetted from the nozzle whereby the number of ink droplets applied on a scanning line is varied depending on the relative density of the successive portions of the image to vary the apparent size of the scanning line. This system is especially effective not only for a recording of characters but also for a recording and reproduction of an image having half tones.

10 Claims, 18 Drawing Figures

IMAGE REPRODUCING SYSTEM

BACKGROUND OF THE INVENTION

1. Field of the Invention

This invention relates to image reproducing systems and more particularly to an ink jet recording system in which an image signal including relative density components is used to charge ink droplets for reproducing on a recording medium an image having a relative density exactly analogous to that of an original.

2. Description of the Prior Art

In an ink jet recording system, ink droplets are caused to impinge against a recording medium so as to record an information image by an assembly of recording dots formed by the impingement of the ink droplets. The ink droplets are generally obtained by supplying a stream of pressurized ink from a source and jetting this pressurized ink from a mechanically vibrated nozzle. In an ink jet recording system of the electrostatic deflection type, individual ink droplets are charged according to the relative density of an information image, and while these charged ink droplets are passing through the space between deflecting electrodes, the flying direction of the ink droplets is deflected so that unnecessary ink droplets can be collected by a collector and the non-collected ink droplets can only be caused to impinge against a recording surface to form recording dots thereon.

However, the prior art ink jet recording system has been defective in that there are certain limitations in the tones and resolution of the recorded image and fine and smoothly changing tones cannot be reproduced due to the fact that the ink droplets emitted from the nozzle have substantially the same size. In an effort to exactly reproduce the relative density of an image carried by an original, various methods have been proposed. According to one of the prior art methods, the size of ink droplets is modulated by an image signal so as to vary the diameter of recording dots printed on a recording medium. According to another method, ink droplets are emitted in the form of a mist and the density of this ink mist is modulated by an image signal. However, all these methods have been impractical in that not only the structure of the system is complex but also the difficulty of control results in an instability. Further, these prior art methods have been defective in that half tones (relative density) of an original varying over multiple stages cannot be exactly reproduced.

SUMMARY OF THE INVENTION

With a view to obviate these prior art defects, it is an object of the present invention to provide an image reproducing system in which the relative density of successive portions of an original varying over multiple stages is detected to obtain a signal and ink droplets jetted from a nozzle are charged in proportion to the varying levels of the signal thus obtained so as to reproduce the relative density of the successive portions of the original on a recording surface more stably and exactly.

Another object of the present invention is to provide an image reproducing system in which the relative density of successivie portions of an image carried by an original is detected by a photoelectric converter and the non-linearity of the output of the photoelectric converter is compensated by a compensating circuit to obtain a signal representing exactly the relative density of the successive portions of the image carried by the original, this signal being utilized for varying the number of recording dots in the scanning line pitch thereby varying the apparent size of the scanning line so as to reproduce finer tones.

Still another object of the present invention is to provide an image reproducing system in which the number of ink droplets applied in overlapping relation to the range within the dot pitch on the same scanning line is varied depending on the relative density of successive portions of an image carried by an original so as to reproduce exactly the relative density varying over multiple stages.

Yet another object of the present invention is to provide an image reproducing system in which the signal used for charging the ink droplets is converted into a signal having the contact screen effect so as to charge the ink droplets by the latter signal.

In accordance with one aspect of the present invention, there is provided an image reproducing system comprising means for producing an image signal including components representing the relative density of successive portions of an image carried by an original, a nozzle supplied with a stream of pressurized ink and vibrated by a vibration imparting element connected to a high frequency source, means for emitting ink droplets of predetermined size from said nozzle in accordance with the operating period of said vibration imparting element, means for applying said image signal components to the ink droplets jetted from said nozzle thereby charging said ink droplets, means for deflecting said charged ink droplets from the flying path depending on the charge carried by said ink droplets, and means for varying the printing density of recording dots in the scanning line pitch or dot pitch on a recording medium depending on the relative density of the successive portions of the image carried by the original.

DESCRIPTION OF THE PREFERRED EMBODIMENTS

An application of the present invention to an ink jet recording system will be described with reference to the drawings.

Figure 1:
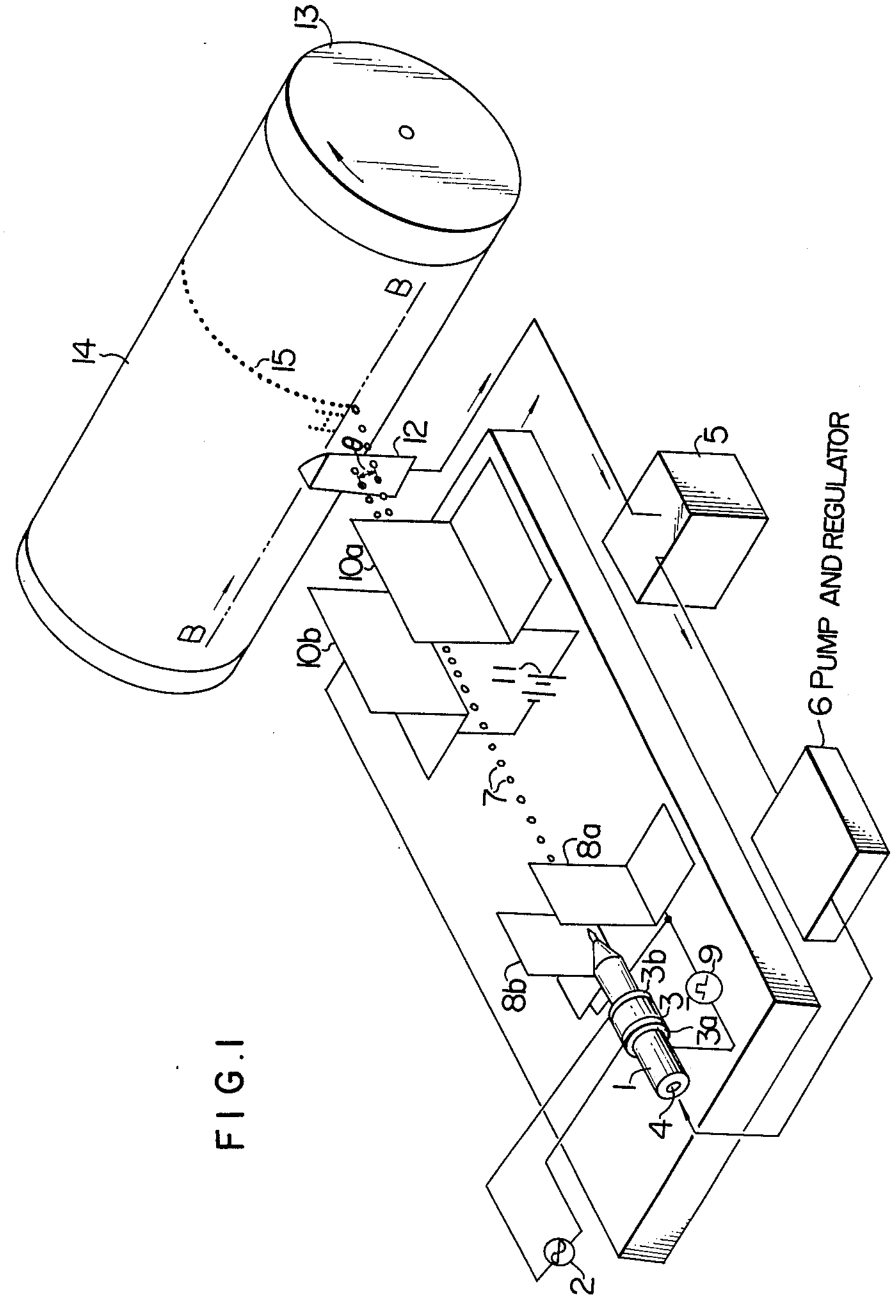
FIG. 1 is a diagrammatic view showing schematically the structure of an ink jet recording system to which the present invention is applied.

Referring to FIG. 1, an ink jet nozzle 1 has a nozzle diameter of about 60 $\mu$ and an annular electromechanical transducing element (vibration imparting element) 3 is mounted on the body of this nozzle 1 for mechanically vibrating the nozzle 1 at a frequency of the order of 70 kHz. The vibration imparting element 3 is made of an electrostrictive material, for example, a sintered product of lead titanate and lead zirconate, and a voltage of 10 to 30 volts is applied from a high frequency power source 2 of 70 kHz to a pair of electrodes 3*a* and 3*b* mounted on the opposite end faces of the vibration imparting element 3 to produce the energy for causing electrostrictive vibrations of the vibration imparting element 3. This energy can also be produced by a magnetostrictive element.

A stream of ink 4 under pressure is supplied to the nozzle 1 from a tank 5 through a pump and pressure regulator unit 6, and this pressure is selected to be about 3 to 4 kg/cm$^2$. Due to the fact that such pressurized ink 4 is supplied to the nozzle 1 which is mechanically vibrated, ink droplets 7 are jetted from the tip of the nozzle 1 at a frequency which is synchronous with the frequency of the voltage applied to the vibration imparting element 3 from the high frequency power source 2. A pair of charging electrodes 8*a* and 8*b* are disposed in front of the nozzle 1 for applying electrical charge to the ink droplets 7. The positional relationship between the nozzle 1 and the charging electrodes 8*a*, 8*b* is such that the ink droplets 7 are jetted from the nozzle 1 at a position substantially intermediate between the charging electrodes 8*a* and 8*b*. These two charging electrodes 8*a* and 8*b* are spaced apart to define a gap of about 2 mm and have a length of about 5 mm. The charging electrodes 8*a* and 8*b* are electrically connected to each other to have the same potential, and an information signal voltage of about 200 volts is applied across the nozzle 1 (to which the pressurized ink 4 is supplied) and the electrodes 8*a*, 8*b* from an information signal voltage source 9. The ink droplets 7 are charged to a negative polarity when the polarity of this information signal voltage is positive.

A pair of deflecting electrodes 10*a* and 10*b* are disposed opposite to each other on opposite sides of the flying path of the ink droplets 7, and a high d.c. voltage source 11 applies a d.c. voltage of 3 to 4 kilovolts across these electrodes 10*a* and 10*b*. These deflecting electrodes 10*a* and 10*b* are disposed at a position spaced apart by about 5 mm from the charging electrodes 8*a* and 8*b*. The gap between these deflecting electrodes 10*a* and 10*b* is selected to be of the order of 5 mm and 7 mm at the inlet and outlet respectively, and these electrodes 10*a* and 10*b* have a length of about 30 mm. The ink droplets 7 charged to the negative polarity are deflected toward the deflecting electrode 10*a* while passing through the gap between these deflecting electrodes 10*a* and 10*b*, and the deflected ink droplets 7 impinge against a recording medium or recording sheet 14 wound around the outer periphery of a rotary drum 13 to form recording dots 15 on the recording sheet 14. The deflection angle $\theta$ of the ink droplets 7 is proportional to the amount of charge carried by the ink droplets 7, that is, the level of the voltage applied from the information signal voltage source 9 when the voltage applied across the deflecting electrodes 10*a* and 10*b* is constant. A bucket 12 is provided for collecting unnecessary ink droplets which are not subjected to deflection by the deflecting electrodes 10*a* and 10*b*. This bucket 12 is disposed in such a position that those ink droplets 7 which are advancing along a straight path impinge against the bucket 12 to be collected thereby, while those ink droplets 7 which are advancing along a curved path do not impinge against the bucket 12.

The rotary drum 13 having the recording sheet 14 wound therearound is rotated in a direction as shown by the arrow so that an information pattern can be recorded on the recording sheet 14 by the recording dots 15 formed by the ink droplets 7 impinging against the recording sheet 14. The ink jetting system is arranged to move in parallel with the axis of the rotary drum 13 so that the point of impingement of the ink droplets 7 against the recording sheet 14 can be shifted on a chain line B–B'. It will be seen therefore that an image recorded on the recording sheet 14 is an assembly of scanning lines and is formed depending on the degree of deflection of the ink droplets 7 jetted out of the nozzle 1.

Figure 2:
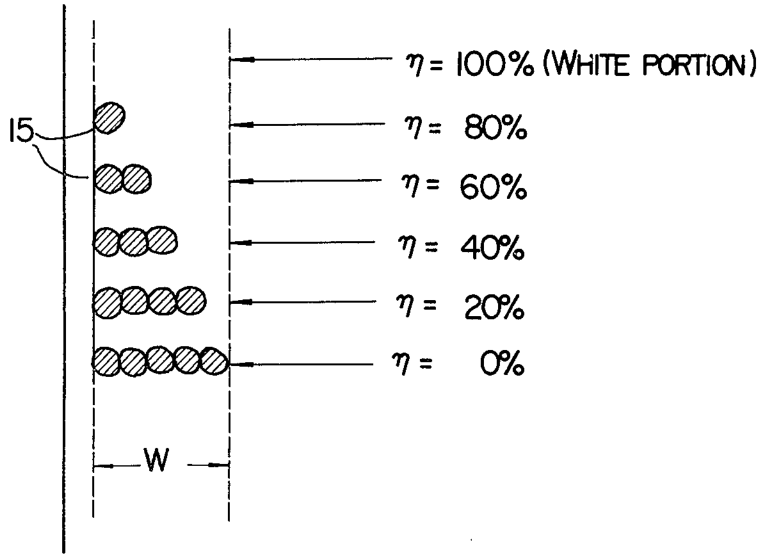
FIG. 2 is an enlarged view showing the manner of recording in which the number of recording dots applied to the range within the scanning line pitch is varied depending on the reflection factor.

FIG. 2 is an enlarged partial view of an image recorded on the recording sheet 14 in the manner above described. In FIG. 2, W represents the width of one scanning line which is referred to hereinafter simply as a scanning line pitch. The number of recording dots 15 in this scanning line pitch W is selected to correspond to the relative density of successive portions of an image carried by an original so that the apparent size of the scanning line can be changed to reproduce the relative density of the successive portions of the image. The printing density of the recording dots 15 in the scanning line pitch W can be varied by pulse width modulation of an amplitude-modulated image signal obtained by photoelectric conversion of the image carried by the original and combining this pulse width-modulated output signal with the signal used for deflecting the ink droplets 7.

Figure 3A:
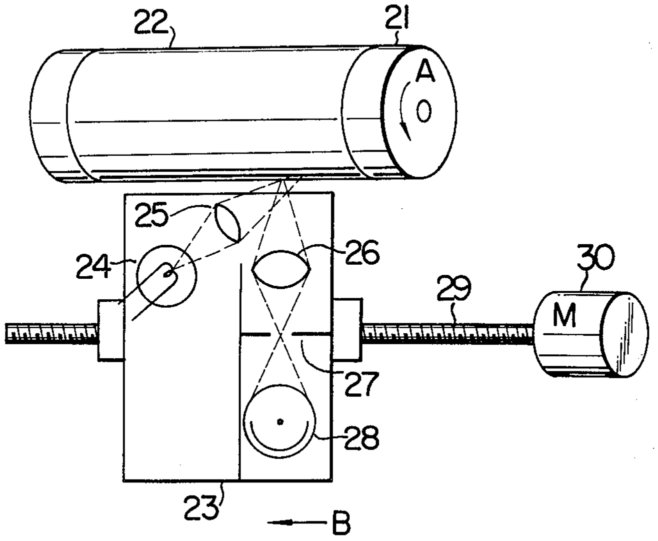
FIG. 3*a* shows the structure of a photoelectric converter.

FIG. 3*a* shows a photoelectric converter for deriving an image signal. Referring to FIG. 3*a*, an original 22 is wound around a rotary drum 21 which is rotated in a direction as shown by the arrow A. An optical system 23 comprises a light source or lamp 24, a condenser lens 25, an objective lens 26, a slit 27 and a photoelectric detecting element 28 such as a photomultiplier or photo transistor. The light emitted from the lamp 24 is condensed by the condenser lens 25 to illuminate the original 22, and the light reflected from the original 22 is received by the objective lens 26 and directed through the slit 27 toward the photoelectric detecting element 28 to be converted into an electrical signal.

This optical system 23 is driven in the axial direction of the rotary drum 21, that is, in a direction as shown by the arrow B by a feed screw 29 rotated by a drive motor 30 so that successive portions of the original 22 can be scanned starting from one end of the original 22. The rotation of the drum 21 and the movement of the optical system 23 are caused in synchronous relation with the movement of the recording drum 13 and nozzle 1 shown in FIG. 1.

Figure 3B:
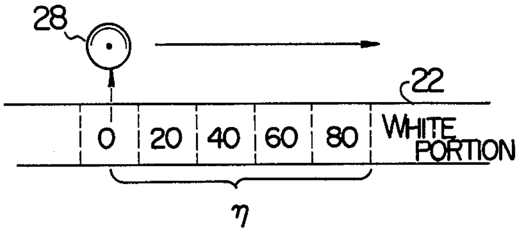
FIG. 3*b* shows the manner of detecting the relative density of successive portions of an image on an original by the photoelectric converter shown in FIG. 3*a*.
Figure 3C:
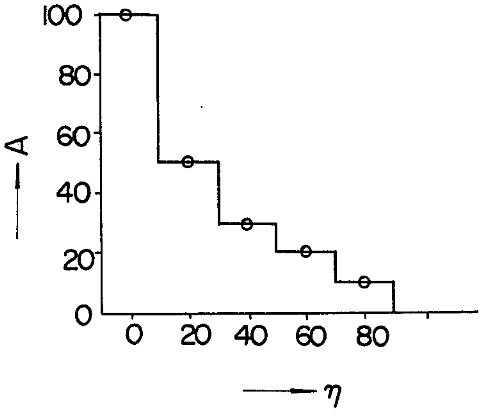
FIG. 3*c* shows the relation between the reflection factor $\eta$ and the output signal A of the photoelectric converter shown in FIG. 3*a*.

FIGS. 3*b* and 3*c* show the relation between the image signal and the relative density of the successive portions of the original 22 which is scanned and subjected to photoelectric conversion in the manner above described. Consider now the reflection factor $\eta$ of the successive portions of the original 22. This reflection factor $\eta$ is about 85 to 90% in a white portion of the original 22 in which any image portion does not exist.

Thus, when the original 22 is scanned by the photoelectric detecting element 28 which detects the reflected light in a manner as shown in FIG. 3*b*, a photoelectrically converted output signal (image signal) A as shown in FIG. 3*c* is obtained. It will be apparent from FIG. 3*c* that there is no linear relation between this photoelectrically converted output signal A and the reflection factor $\eta$.

In pulse width modulation of an amplitude-modulated signal as described previously, it is a common practice to superpose a linearly varying triangular waveform signal or saw-tooth waveform signal on this amplitude-modulated signal and amplify only the signal portion above a suitable slice level for carrying out the pulse width modulation. However, even when the pulse width modulation is carried out by superposing such a linearly varying signal on the photoelectrically converted output signal (image signal) A having no linear relation with the reflection factor $\eta$ as shown in FIG. 3*c*, the pulse width of the signal thus obtained does not also have a linear relationship with the reflection factor $\eta$ of the original 22.

Therefore, when such a pulse width-modulated signal is combined in that form with the signal used for deflecting the ink droplets 7 and the composite signal is used for charging the ink droplets 7, the recorded image thus obtained does not exactly reflect the reflection factor $\eta$ of the original 22, and this is undesirable.

Various attempts have been made in which the photoelectrically converted output signal A is applied to a variety of waveform compensating circuits to obtain a waveform which has substantially a linear relationship with the reflection factor $\eta$. However, these attempts have resulted in extreme complexity of the waveform compensating circuits.

According to the present invention therefore, the photoelectrically converted output signal A which has no linear relationship with the reflection factor $\eta$ of the original 22 is not subjected to any waveform compensation, and the amplitude of the signal to be superposed on this signal A is suitably selected so as to compensate the non-linearity of the output signal A of the photoelectric converter used for scanning the original 22.

Figure 4:
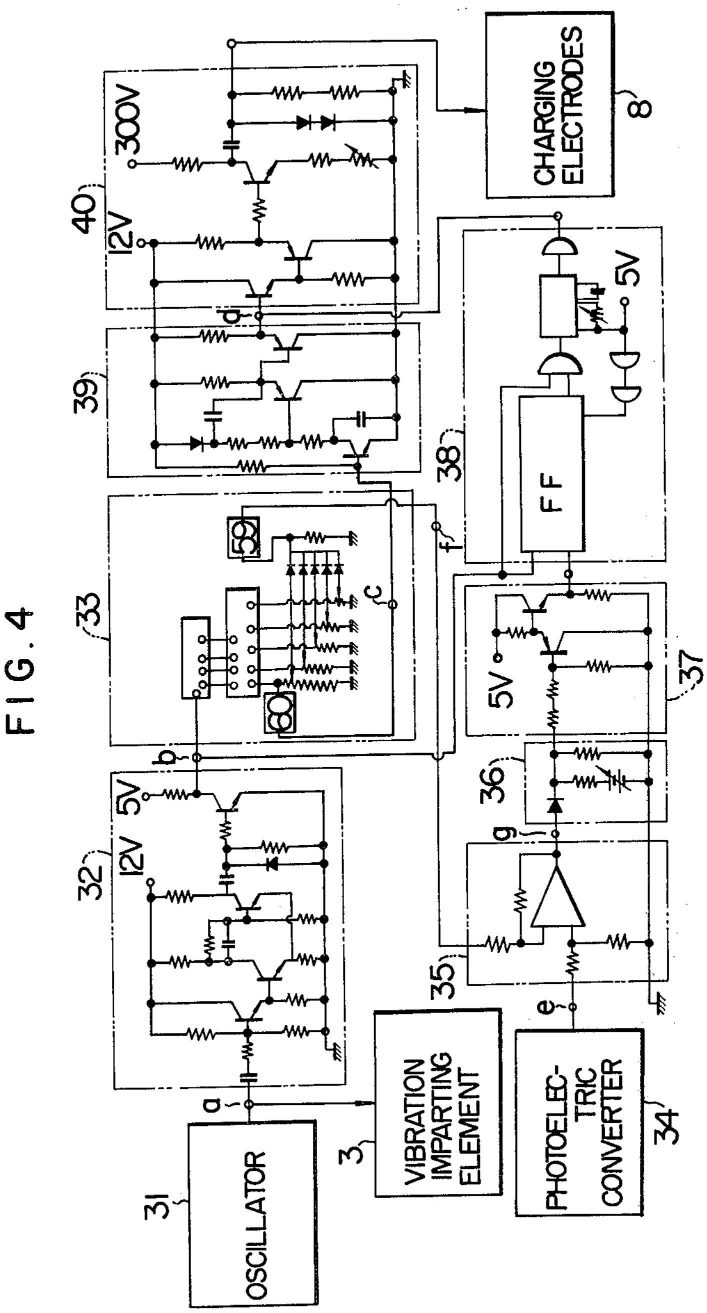
FIG. 4 is a block diagram of an embodiment of the system according to the present invention.

FIG. 4 is a block diagram of an embodiment of the present invention. Referring to FIG. 4, the output of an oscillator 31 is applied to a waveform shaping circuit 32 such as a Schmitt circuit to be shaped to have a predetermined pulse width, and the shaped output of the shaping circuit 32 is applied to a frequency dividing circuit 33. The frequency division ratio of this frequency dividing circuit 33 is selected to be equal to the maximum number of dots recorded in the scanning line pitch W.

The output of this frequency dividing circuit 33 and the output of the photoelectric converter 34 shown in FIG. 3*a* are applied to a combining circuit 35 to be combined together. The output of this combining circuit 35 is applied to a slicing circuit 36 having a predetermined slice level, and the signal portion above this slice level is applied to an amplifier 37 to be amplified thereby, and at the same time, to be converted into a pulse width corresponding to the reflection factor $\eta$ of successive portions of the original 22. The signal amplified by the amplifier 37 and the output of the waveform shaping circuit 32 are combined together by an AND circuit 38 composed of a flip-flop and other elements.

A saw-tooth waveform generating circuit 39 generates a saw-tooth waveform signal at a frequency synchronous with the output of the frequency dividing circuit 33. The output of this saw-tooth waveform generating circuit 39 and the output of the AND circuit 38 are combined together by a combining circuit 40, and the output of this combining circuit 40 is applied across the charging electrodes 8*a* and 8*b* shown in FIG. 1 for charging the ink droplets 7 thereby obtaining recording dots 15 as shown in FIG. 2.

Figure 5:
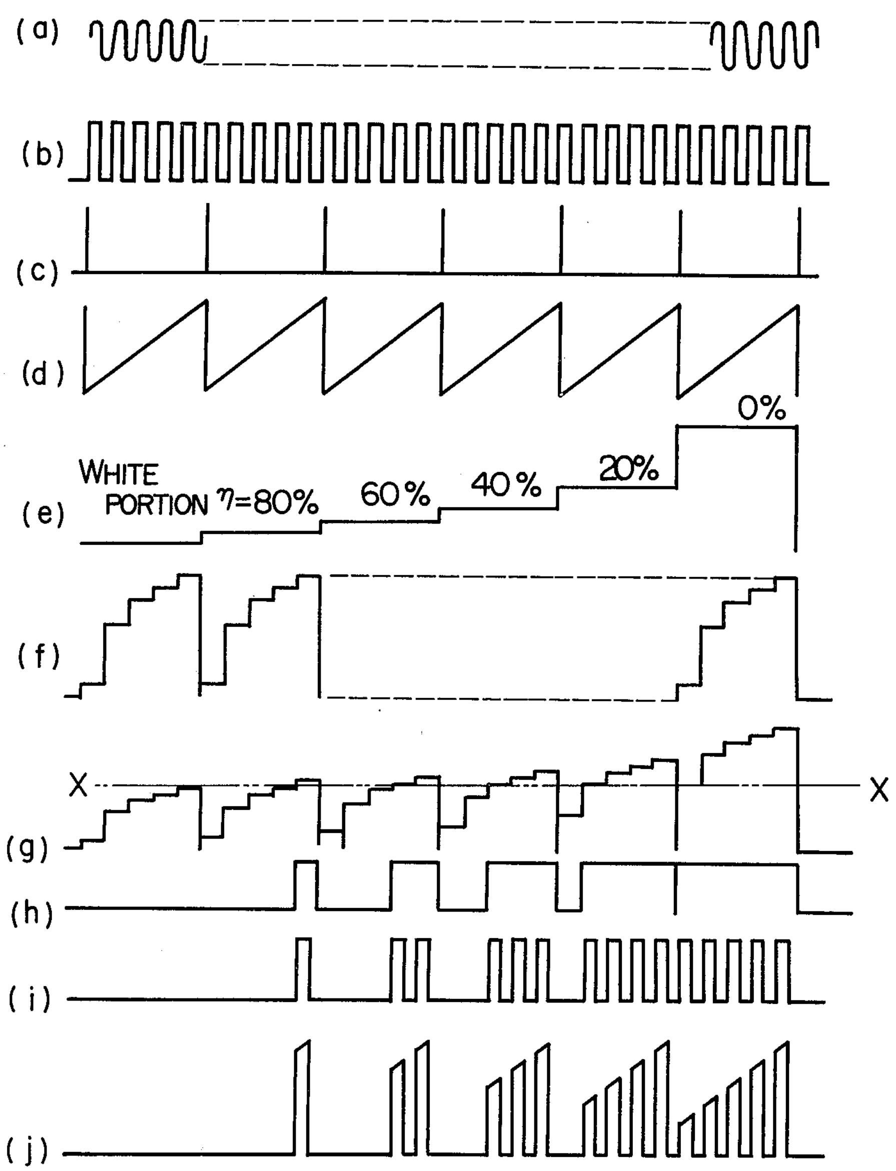
FIG. 5 shows output waveforms appearing at various parts of FIG. 4.

The operation of the system of the present invention having a structure as above described will now be described with reference to FIG. 5 which shows waveforms appearing at various parts of FIG. 4.

The output of the oscillator 31 having an output waveform as shown in FIG. 5*a* is shaped into pulses having a predetermined pulse width as shown in FIG. 5*b* by the waveform shaping circuit 32 and is also applied to the vibration imparting element 3 mounted on the nozzle 1. Therefore, the ink droplets 7 are jetted from the nozzle 1 in synchronism with the frequency of the output of this waveform shaping circuit 32. The frequency of the pulse signal thus shaped in waveform is divided by the frequency dividing circuit 33 to determine the maximum number N of dots 15 in the scanning line pitch W. This maximum number N of dots 15 is five in this embodiment.

Figure 6:
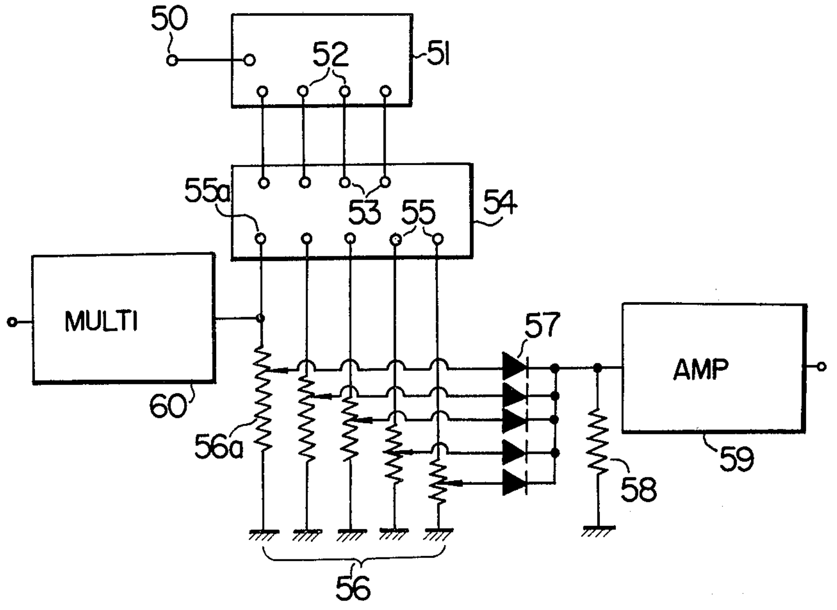
FIG. 6 is a connection diagram of a compensating circuit.
Figure 7A:
FIG. 7*a* shows an input waveform applied to the circuit shown in FIG. 6.

The structure and operation of this frequency dividing circuit 33 will be described with reference to FIGS. 6 and 7. Referring to FIG. 6, the frequency dividing circuit 33 comprises a decode counter 51 having an input terminal 50, and a decoder 54 having a plurality of input terminals 53 connected to respective output terminals 52 of the decode counter 51. The decoder 54 is provided with a plurality of output terminals 55 the number of which is equal to the frequency division ratio of the frequency dividing circuit 33. Thus, the decoder 54 has, for example, five output terminals 55. These output terminals 55 are connected to a variable resistor group 56. Diodes 57 are connected at one terminal thereof to respective movable terminals of the variable resistor group 56 and at the other terminal thereof to a resistor 58 and an amplifier 59. A pulse width regulator 60 which may be a multivibrator is connected to the connection point between the first resistor 56*a* in the variable resistor group 56 and the first output terminal 55*a* of the decoder 54.

Figure 7B:
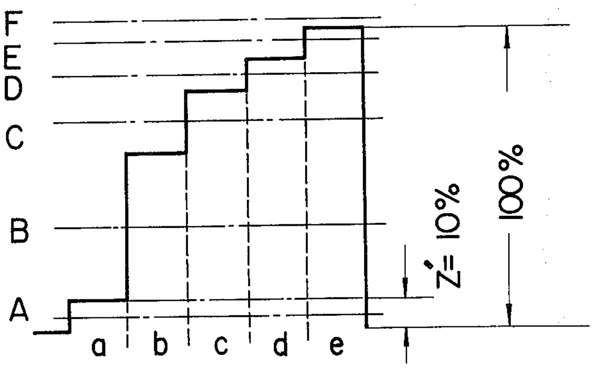
FIG. 7*b* shows an output waveform appearing from the circuit shown in FIG. 6.

An output signal as shown in FIG. 7*b* appears from the amplifier 59 when an input signal as shown in FIG.

7*a*, that is, the output signal (FIG. 5*b*) of the waveform shaping circuit 32 is applied to the input terminal 50 of the decode counter 51. This output signal appears in the form of an adjusted stepped waveform as shown in FIG. 7*b* when the resistance values of the individual resistors in the variable resistor group 56 are suitably varied. This adjusted stepped output waveform is selected to compensate the non-linearity of the output signal A of the photoelectric converter 34 shown in FIG. 3*a*.

Referring to FIG. 3*c* again, this output signal A of the photoelectric converter 34 has a level of 100% (relative value) when light is reflected from the portion where the reflection factor $\eta$ is 0%. The step a in FIG. 7*b* is taken as a reference level or zero level corresponding to the output signal level of $A = 100\%$. The output signal A has a level of 50% when the reflection factor $\eta$ is 20%. The step *b* in FIG. 7*b* is selected to have a level of 50% corresponding to the output signal level of $A = 50\%$. Similarly, the steps *c*, *d* and *e* are selected to have levels of 70%, 80% and 90% corresponding to the output signal levels of $A = 30\%$, $A = 20\%$ and $A = 10\%$ which are obtained when the reflection factors $\eta$ are 40%, 60% and 80% respectively. A bias voltage Z of 10% is applied to all the steps of this stepped output waveform so that the steps *e*, *d*, *c*, *b* and *a* in FIG. 7*b* have respective amplitudes of 100%, 90%, 80%, 60% and 10%. Then, slice levels for the stepped output waveform thus obtained are determined as shown by A, B, C, D, E and F. It will be seen that a 100% pulse width remains within the range of from the step a to the step *e* in the case of the slice level A, an 80% pulse width remains within the range of from the step *b* to the step *e* in the case of the slice level B, a 60% pulse width remains within the range of from the step *c* to the step *e* in the case of the slice level C, a 40% pulse width remains within the range of from the step *d* to the step *e* in the case of the slice level D, a 20% pulse width remains within the range of the step *e* only in the case of the slice level E, and no pulse width remains in the case of the slice level F. It will thus be understood that the frequency dividing circuit 33 acts also as a compensating circuit for compensating the non-linearity of the photoelectrically converted output signal A, and the output of this frequency dividing circuit 33 has a waveform as shown in FIG. 5*f*.

The output signal of the photoelectric converter 34 which converts photoelectrically the successive portions of the image carried by the original 22 has a waveform as shown in FIG. 5*e* in which it will be seen that the signal level is variable depending on the reflection factor $\eta$ of the successive portions of the original 22. The output signal of the frequency dividing circuit 33 and the output signal of the photoelectric converter 34 are combined together by the combining circuit 35, and a composite signal as shown in FIG. 5*g* appears from the combining circuit 35. This composite signal shown in FIG. 5*g* is applied to the slicing circuit 36 having a slice level X—X, and the signal portion above this slice level X—X is amplified by the amplifier 37 to obtain a signal as shown in FIG. 5*h*. The pulses in this amplified signal shown in FIG. 5*h* have different pulse widths depending on the reflection factor $\eta$ of the different portions of the image carried by the original 22.

The signal shown in FIG. 5*h* and the output signal (FIG. 5*b*) of the waveform shaping circuit 32 are applied to the AND circuit 38 to obtain a signal as shown in FIG. 5*a*. This output signal of the AND circuit 38 is combined by the combining circuit 40 with the output signal (FIG. 5*d*) of the saw-tooth waveform generating circuit 39 which is synchronous with the output signal of the frequency dividing circuit 33, and the composite signal thus obtained is amplified to obtain an output signal as shown in FIG. 5*j*. This signal is applied across the charging electrodes 8*a* and 8*b* shown in FIG. 1 so as to obtain recording dots 15 of density which is variable in the widthwise direction of the scanning line pitch W as shown in FIG. 2.

As seen in FIG. 2, no ink droplets 7 are applied to the recording sheet 14 when a white portion of the original 22 is scanned. When an image portion having a reflection factor $\eta$ of 80% is scanned, one recording dot 15 is formed within the scanning line pitch W and the white portion of the recorded image portion occupies about 80% of the scanning line pitch W. Two recording dots 15 are formed when an image portion having a reflection factor $\eta$ of 60% is scanned, and five recording dots 15 are formed when an image portion having a reflection factor $\eta$ of 0% is scanned.

It will thus be understood that, according to the present invention, the output signal of the compensating circuit is varied to compensate the nonlinearity of the image signal obtained by photoelectric conversion of successive portions of an original so that the number of recording dots in the scanning line pitch can be varied depending on the relative density of the successive portions of the image carried by the original. Thus, the apparent size of the scanning line can be varied and reproduction of tones of multiple stages can be stably and reliably attained. In the embodiment above described, the reproduced image has the tones of six stages including the white portion. While this embodiment can be satisfactorily used for the reproduction of graphs and drawings, it is not yet completely satisfactory for the reproduction of an original such as a photograph which includes finer half tones.

Figure 8:
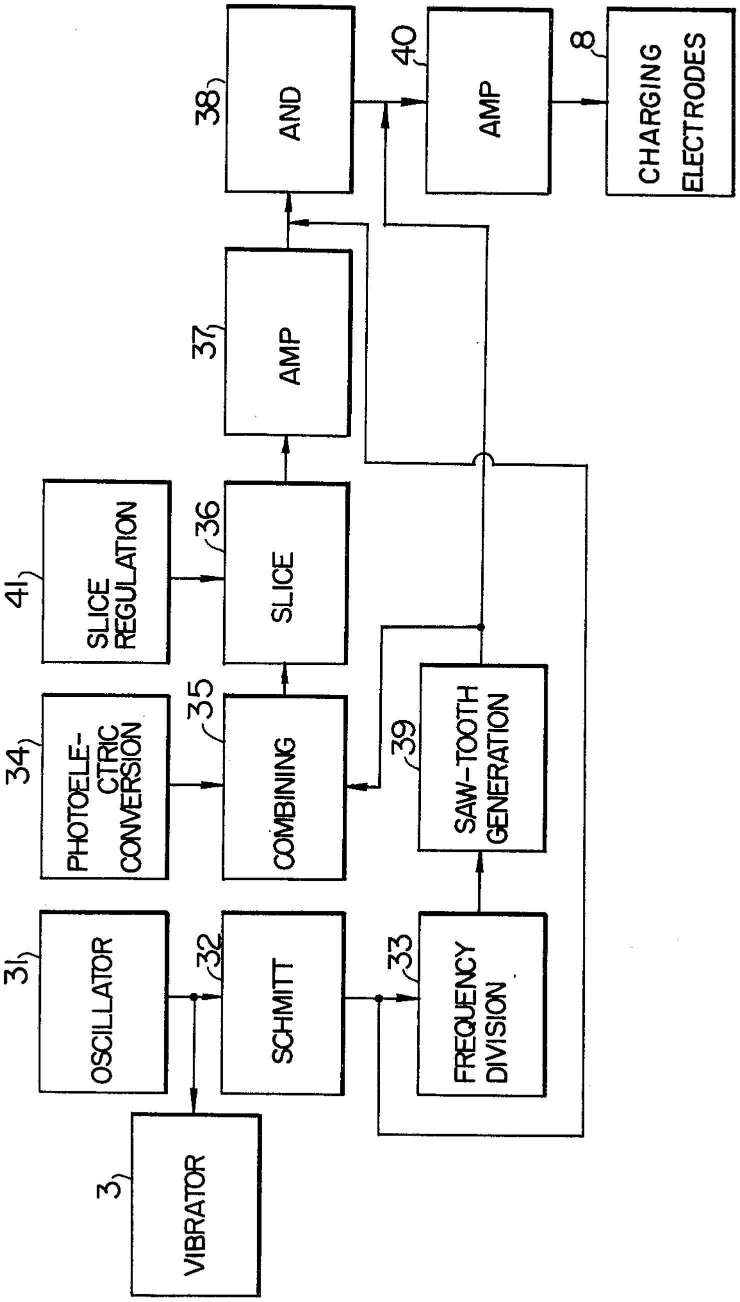
FIG. 8 is a block diagram of another embodiment of the present invention.

FIG. 8 is a block diagram of another embodiment adapted for the reproduction of such an original with improved fidelity. In FIG. 8, like reference numerals are used to denote like parts appearing in FIG. 4, and therefore, any detailed description of such parts is not especially given.

Figure 9:
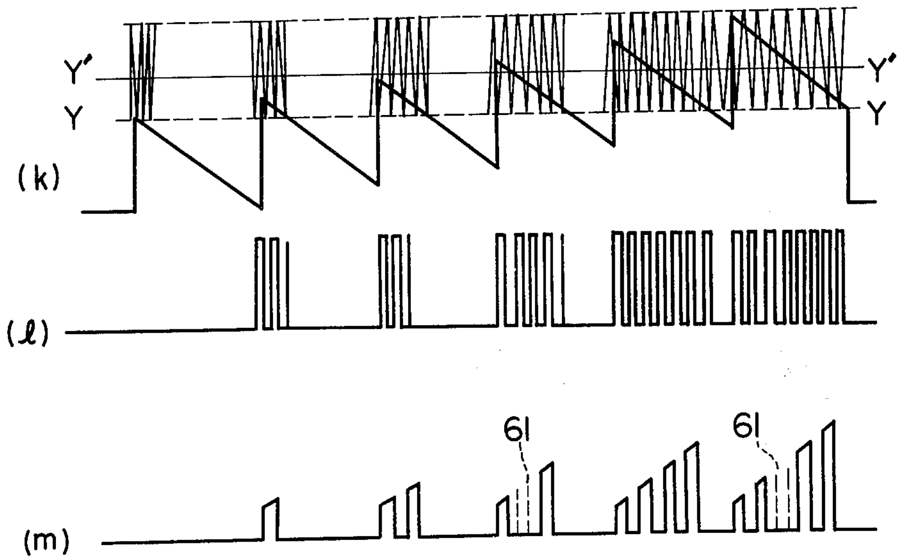
FIG. 9 shows output waveforms appearing at various parts of FIG. 8.

Referring to FIG. 8, a suitable signal such as a sinusoidal waveform signal, square waveform signal or triangular waveform signal is produced from a slice level regulating circuit 41 which is constructed so that the slice level of a slicing circuit 36 can be varied to any desired level above and beneath a line Y'—Y' shown in FIG. 9*k*. The output of the slicing circuit 36 obtained by slicing the input at a slice level of, for example, Y—Y is amplified by an amplifier 37 to obtain a signal as shown in FIG. 9*l*. This amplified signal shown in FIG. 9*l* and an output signal of a waveform shaping circuit 32 having a waveform as shown in FIG. 5*b* are applied to an AND circuit 38, and then the output signal of the AND circuit 38 is combined with an output signal of a saw-tooth waveform generating circuit 39 having a waveform as shown in FIG. 5*d* as in the preceding embodiment so as to obtain a signal as shown in FIG. 9*m*. The signal shown in FIG. 9*m* includes a pulseless portion 61 and differs from the pulse signal shown in FIG. 5*i* which is used for charging the ink droplets 7. This pulse-less portion 61 appears due to the frequency difference and phase difference between the output signal (FIG. 5*b*) of the waveform shaping circuit 32 and the output signal of the slice level regulating circuit 41.

This pulse-less portion 61 provides electrically the function of the contact screen employed in the photographic technique so that reproduced image portions include finer half tones providing smoother changes of the relative density.

The two embodiments above described have referred to the case in which the printing density or the number of recording dots varies in the widthwise direction of the scanning line pitch W. However, the printing density on the same scanning line may be varied by varying the number of dots in the dot pitch.

Another embodiment of the present invention based on such an idea will be described with reference to FIGS. 10 to 15.

Figure 10:
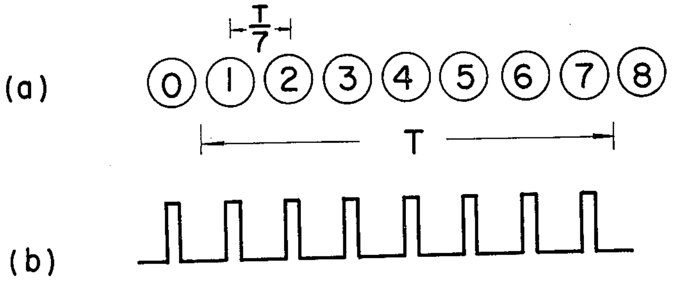
FIG. 10 shows the manner of emission of ink droplets and the timing of application of an information signal in a further embodiment of the present invention.

FIG. 10 shows the relation between the ink droplets 7 jetted from the nozzle 1 and the information signal pulses used for charging these ink droplets 7. Referring to FIG. 10*a*, N ($N = 7$) ink droplets 7 are jetted from the nozzle 1 within a frequency dividing period T. Referring to FIG. 10*b*, seven information signal pulses appear in synchronism with the emission of the seven ink droplets 7 from the nozzle 1. When the pulses shown in FIG. 10*b* are used to charge the ink droplets 7, all the ink droplets 7 are charged and applied to the recording sheet 14 to form the recording dots 15.

Figure 11:
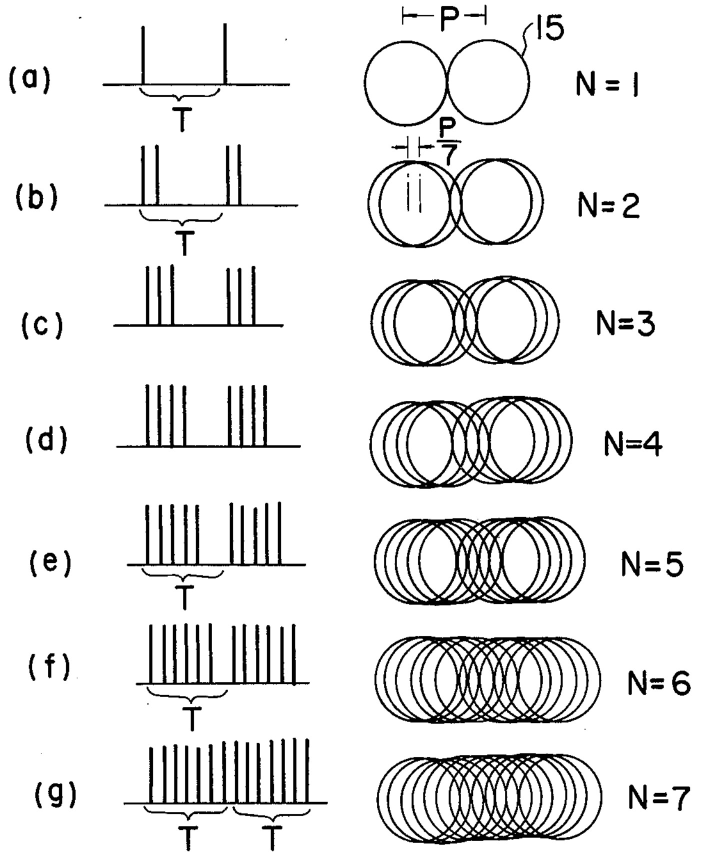
FIG. 11 shows the relation between the number of information signal pulses and the number of recording dots in the further embodiment of the present invention.

FIG. 11 shows the relation between the number N of information signal pulses used for charging the ink droplets 7 appearing within the period T and the number of dots 15 thus recorded. In FIG. 11, P designates the pitch between the dots recorded when the information signal pulses are applied at intervals of N pulses. It will be seen from FIG. 11*a* that the adjacent recording dots 15 are applied without any overlap when $N = 1$. With the increase in the number N of information signal pulses from 2 to 7, the number of recording dots 15 applied in overlapping relation is successively increased as seen in FIGS. 11*b* to 11*g*. It will be seen that the dot applied by the second pulse in FIG. 11*b* is displaced by P/7 from the dot applied by the first pulse in FIG. 11*a*, the dot applied by the third pulse in FIG. 11*c* is also displaced by P/7 from the dot applied by the second pulse in FIG. 11*b*, and so on.

Figure 13:
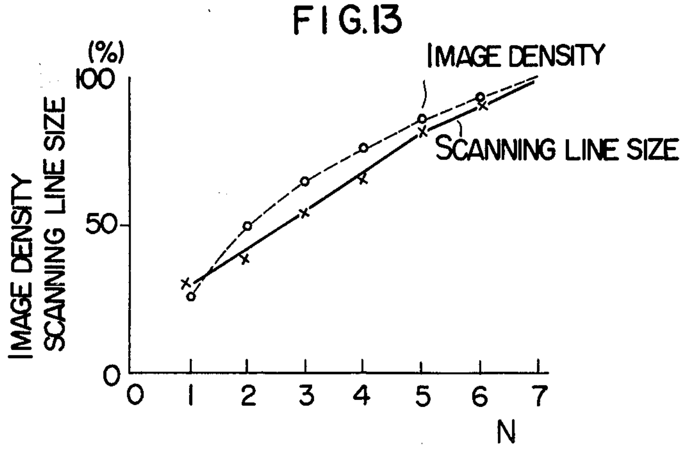
FIG. 13 shows the size of the scanning line and the image density relative to the number of information signal pulses.
Figure 12:
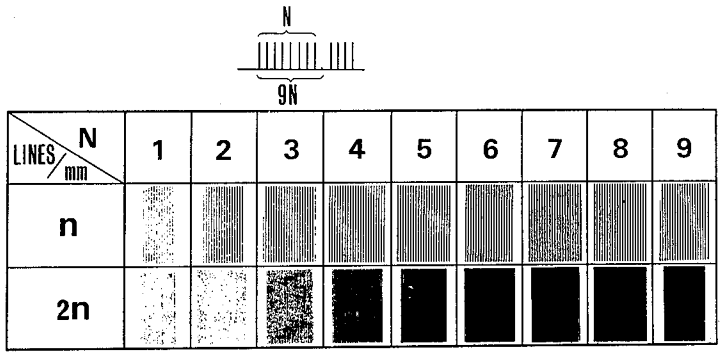
FIG. 12 shows the relation between the number of information signal pulses and the scanning line density in an actual recording operation by the system of the present invention.

An actual example of record is shown in FIG. 12. FIG. 12 shows the relation between the number N of information signal pulses and the scanning line density *n* indicating the number of scanning lines per mm. FIG. 13 shows the image density and scanning line size relative to the number N of information signal pulses. It will be apparent from FIG. 13 that both the size of the scanning line and the density of the image increase with the increase in the number N of information signal pulses.

Figure 14:
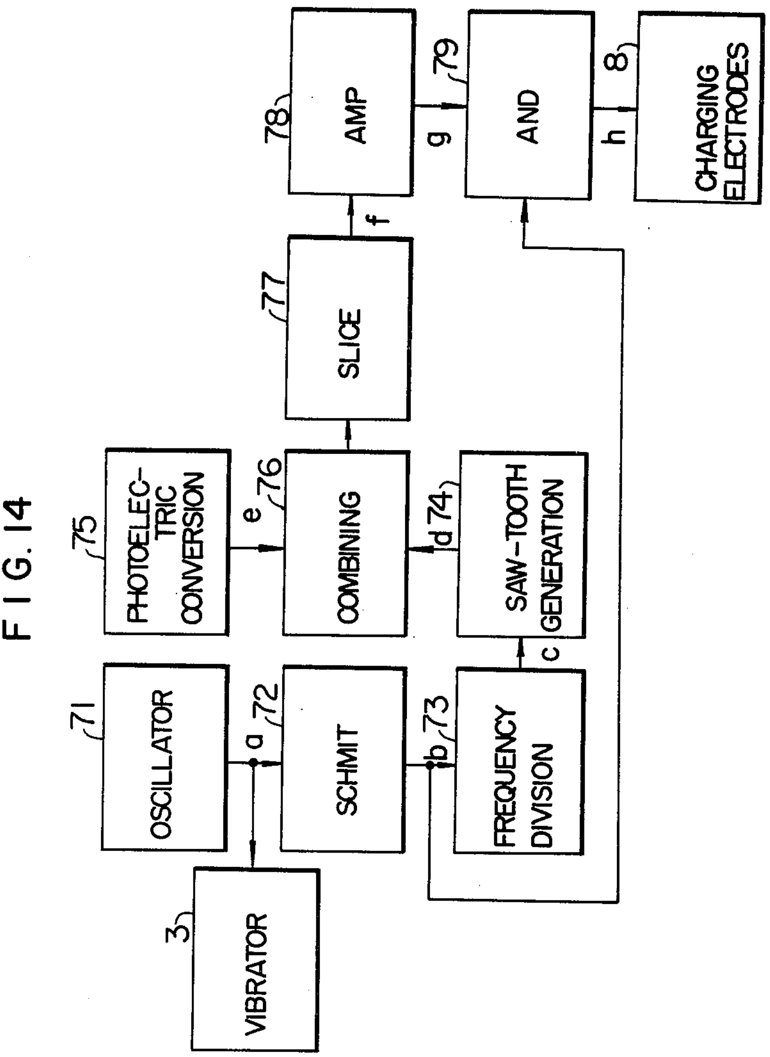
FIG. 14 is a block diagram of the further embodiment of the present invention.
Figure 15:
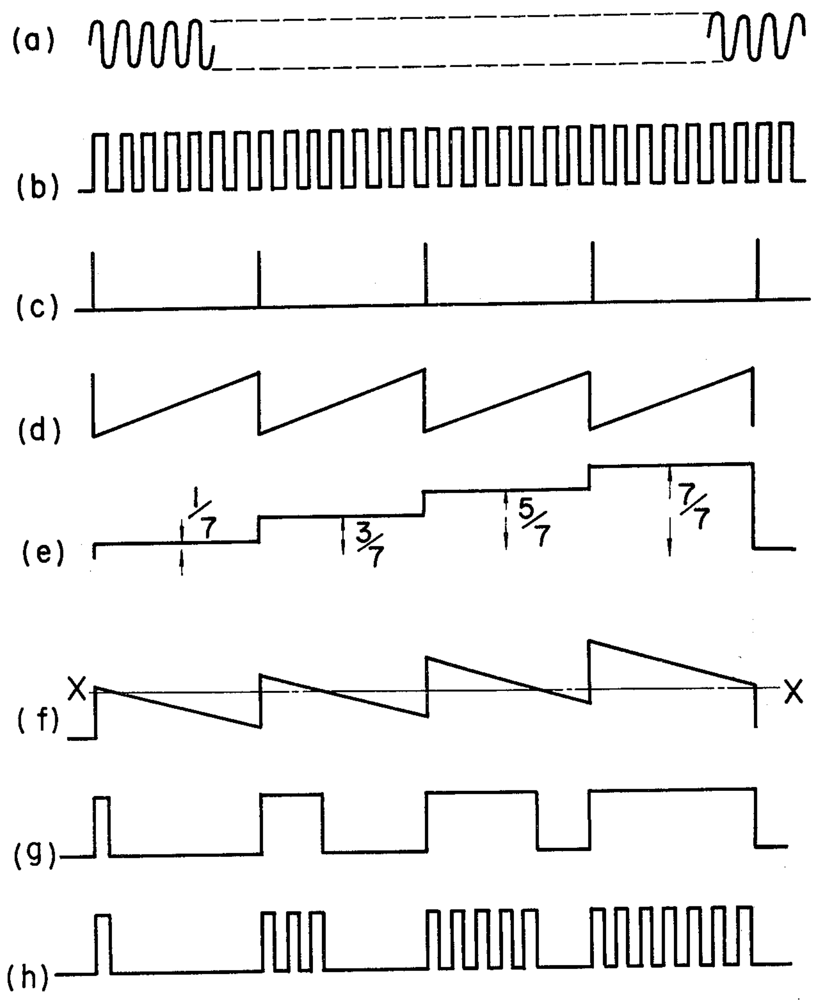
FIG. 15 shows output waveforms appearing at various parts of FIG. 14.

FIG. 14 is a block diagram of the embodiment adapted for carrying out such manner of recording. Referring to FIG. 14, an oscillator 71 generates an output having, for example, a sinusoidal waveform as shown in FIG. 15*a*, and this oscillator output is amplified and applied to the vibration imparting element 3 mounted on the nozzle 1 shown in FIG. 1. A waveform shaping circuit 72 such as a Schmitt circuit is connected to the oscillator 71 for shaping the output waveform of the oscillator 71 into a predetermined pulse width. The output of this waveform shaping circuit 72 has a waveform as shown in FIG. 15*b*. This shaped waveform signal is applied to a frequency dividing circuit 73 which divides the frequency of the input signal into 1/7 as shown in FIG. 15*c* according to the period T shown in FIG. 10.

A saw-tooth waveform generating circuit 74 generates a saw-tooth waveform signal as shown in FIG. 15*d* in synchronism with the frequency dividing period T of the frequency dividing circuit 73. In lieu of the saw-tooth waveform generating circuit 74, a triangular waveform generating circuit or a stepped waveform generating circuit may be employed. A photoelectric converter 75 delivers an output having different amplitudes proportional to the relative density of successive portions of an image carried by an original 22 as shown in FIG. 15*e*. In FIG. 15*e*, it is supposed that the image carried by the original 22 has four density levels of 1/7, 3/7, 5/7 and 7/7 for convenience of description. A combining circuit 76 combines the output signal of the photoelectric converter 75 with the output of the saw-tooth waveform generating circuit 74 so as to obtain a composite signal as shown in FIG. 15*f*. The output of this combining circuit 76 is sliced by a slicing circuit 77 having a slice level X—X as shown in FIG. 15*f*, and the signal portion above this slice level is amplified by an amplifier 78 to obtain a signal as shown in FIG. 15*g*. The output of the amplifier 78 and the output of the waveform shaping circuit 72 are applied to an AND circuit 79, and the output of the AND circuit 79 is amplified to provide a signal as shown in FIG. 15*h*. This signal is applied across the charging electrodes 8*a* and 8*b* shown in FIG. 1 so that the ink droplets 7 jetted from the nozzle 1 can be charged depending on the image information signal. Due to the fact that the number of pulses in the image information signal is varied in proportion to the relative density of the successive portions of the image carried by the original 22, the relative density of the successive portions of the image carried by the original 22 can be reproduced as changes in the size of the scanning line and the density of the image as shown in FIGS. 12 and 13.

While FIG. 11 illustrates the case in which the adjacent recording dots contact with each other when the number N of information signal pulses appearing in the period T is one ($N = 1$), these dots may overlap each other or may be spaced apart from each other. Any appreciable change does not occur in the record in spite of a slight change in the pitch P between the dots.

We claim:

1. An image reproducing system comprising means for producing an image signal including components representing the relative density of successive portions of an original carrying an image to be recorded on a recording medium in a plurality of scanning lines, means for emitting ink droplets of predetermined size from a nozzle in accordance with the operating period of a vibration imparting element mounted on said nozzle, means for producing a signal in synchronizm with the emission of said ink droplets from said nozzle, means for dividing the frequency of the signal produced in synchronism with the emission of said ink droplets thereby determining the maximum number of ink droplets to be emitted within the period of frequency division, means for converting the pulses appearing within said period of frequency division into pulses corresponding to the relative density of the successive portions of the image in response to the application of said image signal components and the output signal of said frequency dividing means, means for charging said ink droplets emitted from said nozzle on the basis of the output of said converting means, means for deflecting said charged ink droplets from the flying path depending on the charge carried by said ink droplets and means for varying the printing density of dots in the dot pitch on the same scanning line depending on the relative density of the successive portions of the original.

2. An image reproducing system as claimed in claim 1, further means comprising for varying the number of ink droplets to be applied in overlapping relation on the same scanning line depending on the relative density of the successive portions of the original.

3. An image reproducing system comprising means for producing a signal in synchronism with the emission of ink droplets from a nozzle, means for dividing the frequency of the output signal of said means, a compensating circuit for compensating the output signal of a photoelectric converter detecting the relative density of successive portions of an original carrying an image and generating a stepped waveform signal having the same frequency as that of the output signal of said frequency dividing means in response to the application of the signal produced in synchronism with the emission of said ink droplets, a converting circuit for slicing the output signal of said compensating circuit and converting the sliced signal into pulses representing the number of ink droplets to be applied to the range within the scanning line pitch or dot pitch, and means for combining the output of said converting circuit with a saw-tooth waveform signal synchronous with the output of said frequency dividing means to deliver an output signal used for charging said ink droplets.

4. An image reproducing system comprising means for producing an image signal including components representing the relative density of successive portions of an original carrying an image to be recorded on a recording body by means of a plurality of scanning lines, means for emitting ink droplets of predetermined size to form said scanning lines on the recording body from a nozzle in accordance with the operating period of a vibration imparting element mounted on said nozzle, means for producing a signal in synchronism with the emission of the ink droplets from said nozzle, means for dividing the frequency of the signal produced in synchronism with the emission of the ink droplets and producing a signal with a predetermined time-function in its amplitude having the period of the frequency division, means for combining said image signal with said time-function signal and producing a pulse signal having a width in accordance with said image signal, means for receiving said pulse signal and said signal produced in synchronism with the emission of the ink droplets and converting said pulse signal into a train of pulses the number of which is in accordance with the image signal, means for charging said ink droplets emitted from said nozzle on the basis of the output of said converting means, and means for deflecting said charged ink droplets from the flying path depending on the charge carried by said ink droplets.

5. An image reproducing system as claimed in claim 4, in which said train of pulses has a frequency such that the ink droplets on the same scanning line are printed in overlapping relation with each other.

6. An image reproducing system comprising means for producing an image signal including components representing the relative density of successive portions of an original carrying an image to be recorded, means for emitting ink droplets of predetermined size from a nozzle in accordance with the operating period of a vibration imparting element mounted on said nozzle, means for producing a signal in synchronism with the emission of the ink droplets from said nozzle, means for dividing the frequency of the signal produced in synchronism with the emission of the ink droplets and producing a signal with a predetermined time-function in its amplitude having the period of the frequency division, means for combining said image signal with said timefunction signal and producing a pulse signal having a width in accordance with said image signal, means for receiving said pulse signal and said signal produced in synchronism with the emission of the ink droplets and converting said pulse signal into a train of pulses the number of which is in accordance with the image signal, means for producing a signal increasing in its amplitude as time elapses having said period of the frequency division, means for combining said train of pulses with said increasing signal, means for charging said ink droplets emitted from said nozzle on the basis of an output of the last said combining means, and means for deflecting said charged ink droplets from the flying path depending on the charge carried by said ink droplets.

7. An image reproducing system comprising means for producing an image signal including components corresponding to the relative density of successive portions of an original carrying an image to be recorded, means for emitting ink droplets of predetermined size from a nozzle in accordance with the operating period of a vibration imparting element mounted on said nozzle, means for producing a signal in synchronism with the emission of the ink droplets from said nozzle, means for dividing the frequency of the signal produced in synchronism with the emission of the ink droplets and producing a signal with a predetermined time-function in its amplitude having the period of the frequency division, means including a combining circuit and a slicing circuit for combining said image signal with said time-function signal and producing a train of pulses through slicing a signal resulting from said combining, the last said means further including a slice regulating circuit for producing an output having a frequency slightly different from the frequency of the emission of the ink droplets for regulation of said slicing, means for obtaining a logical product of said signal produced in synchronism with the emission of the ink droplets and said train of pulses to irregularly prevent production of a part of said train of pulses, means for charging said ink droplets emitted from said nozzle on the basis of the output of the last said means, and means for deflecting said charged ink droplets from the flying path depending on the charge carried by said ink droplets.

8. An image reproducing system as claimed in claim 7, in which said slice regulating circuit is connected to said slicing circuit and changes the slice level in accordance with the output thereof.

9. An image reproducing system as claimed in claim 7, in which said slice regulating circuit is connected to said combining means so that the output of said slice regulating circuit is superimposed on said signal resulting from said combining, and said slicing is carried out with a predetermined fixed slice level.

10. An image reproducing system comprising means for producing a signal in synchronism with the emission of ink droplets from a nozzle, means for dividing the frequency of the output signal of said means, a compensating circuit for compensating the output signal of a photoelectric converter detecting the relative density of successive portions of an original carrying an image and generating an output signal having the same frequency as that of the output signal of said frequency dividing means in response to the application of the signal produced in synchronism with the emission of said ink droplets, a converting circuit for slicing the output signal of said compensating circuit and converting the sliced signal into pulses representing the number of ink droplets to be applied to the range within the scanning line pitch or dot pitch, and means for combining the output of said converting circuit with a signal synchronous with the output of said frequency dividing means to deliver an output signal used for charging said ink droplets.

* * * * *